Figure 1:

Patented Aug. 14, 1928.

1,680,327

UNITED STATES PATENT OFFICE.

ALBERT L. EICHER, OF CANAL FULTON, OHIO.

METHOD OF FORGING GEAR WORMS.

Application filed June 26, 1926. Serial No. 118,659.

The invention relates to a method of forging worms for driving gears in automobiles and the like, and more particularly worms designed to be operated at high rotational speeds, worms for this purpose usually having multiple threads and a relatively long lead.

The usual method of manufacturing gear worms has been to forge a cylindric blank and to machine the threads therein by machine cutting away all the material between threads. This method is disadvantageous not only because of the large waste of material due to the necessity for cutting away all the material between threads, and to the relatively large amount of time required for such operations; but also because the material of the resulting gear worm is weaker at the base of the threads than at the outer ends thereof, due to the fact that the relatively strong outer portion of the forged cylindric gear blank has been cut through by the machining operation, and this cutting operation, likewise prevents the thread surfaces from being uniformly hard.

Forging threads in gear worms enables a substantial saving of material by doing away with the necessity of cutting away all the material between threads; reduces the time required for the relatively small amount of machining necessary for preparing the surfaces of the forged threads for the subsequent manufacturing operations; provides a gear worm which is stronger than gear worms made by machining forged cylindric blanks, due to the fact that the machining of the forged threads does not cut through into the relatively weak central portions of the gear worm; and also provides for substantially uniform hardness of the thread surfaces.

It is an object of the present invention to provide an improved method for securing the advantages of forged threads for gear worms.

In my prior Patent, No. 1,474,516 I set forth an improved method of forging gear worms which is very well adapted to the forging of multiple threaded gear worms having a relatively short lead, but which has not been found as satisfactory as the method herein set forth, for the forging of worms having a relatively long lead and usually having multiple threads, due in great measure to the relatively large undercutting of the threads of a worm having a long lead; and another object of the present invention is to provide an improved method of forging gear worms having a relatively long lead.

Moreover, according to the disclosure of my former patent, it is necessary to use two pairs of thread impressions in the dies; whereas another object of my present invention is to provide for completely forging gear worms by the use of a single pair of thread impressions.

Furthermore, in utilizing the method of the aforementioned patent a fin or flashing is always formed on the worm being operated on by the preliminary forging dies; and it is a further object of the present improvement to forge worms without producing any fin or flashing, thereby substantially economizing the amount of material required for the worms.

The foregoing and ancillary objects are attained by the present process in which a worm blank is provided with forged threads by a single set of thread impressions which may have a particular conformation hereinafter to be set forth in detail, by subjecting the preferably cylindric blank to a series of blows of the thread impressions, the blows being preferably regulated so that the depth of penetration of the thread impressions into the worm blank is constantly increased, and the blank being rotated preferably between each blow, the amount of rotation being determined by suitable arranged indicators.

Forged gear worms made according to the method herein set forth differ from other gear worms, and from gear worms made according to my prior patent, in the rearrangement of the particles in the gear worm during and by the forging process.

In the manufacture of gear worms according to the usual method of machine cutting the threads from a forged cylindric blank, there is substantially no displacement of the particles of the blank.

In the manufacture of gear worms by the forging method of my prior patent there is considerable vertical displacement of the particles in the cylindric blank due to the preliminary forging operation and there is some longitudinal displacement of the particles by the correcting dies.

In gear worms made according to the present method, however, there is a spiral displacement of the particles in the original cylindric blank. That is to say surface particles which lie in cylindric elements of the cylindric worm blank, are found to lie in spiral elements of the threads after the forging operation is completed.

The improved method thus set forth in general terms may be carried out by means of the dies and partial formations, illustrated in the accompanying drawing forming part hereof, in which—

Figure 2:
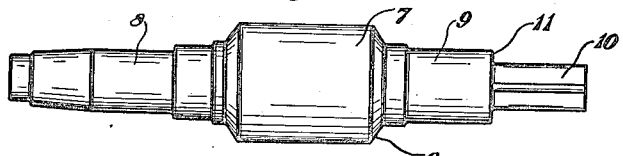
Figure 3:
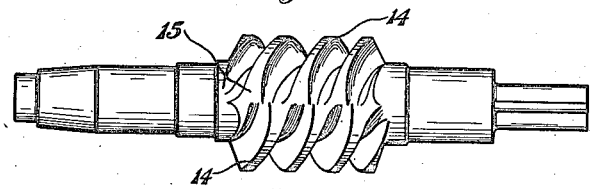
Figure 4:
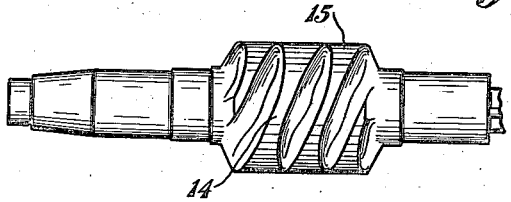
Figure 4A:
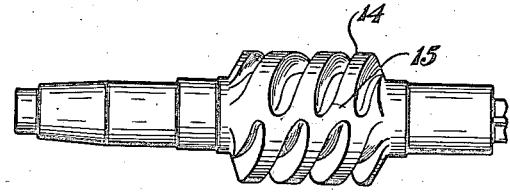
Figure 5:
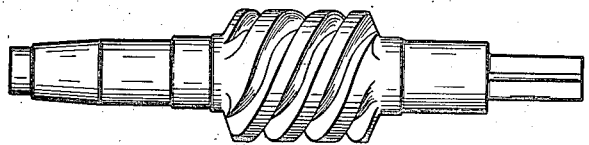
Figure 6:
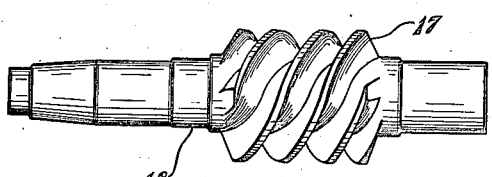
Figure 7:
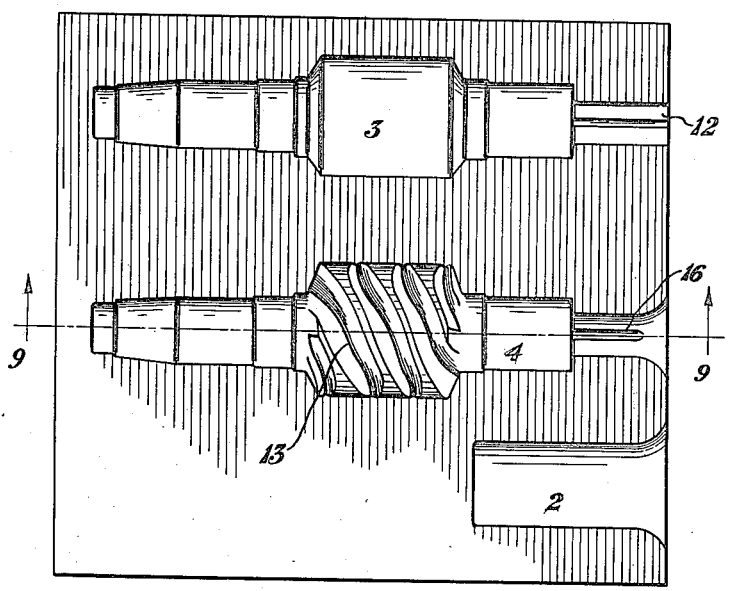
Figure 8:
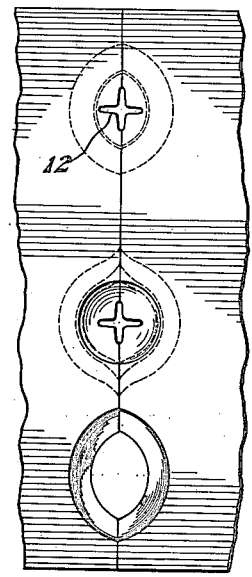
Figure 9:
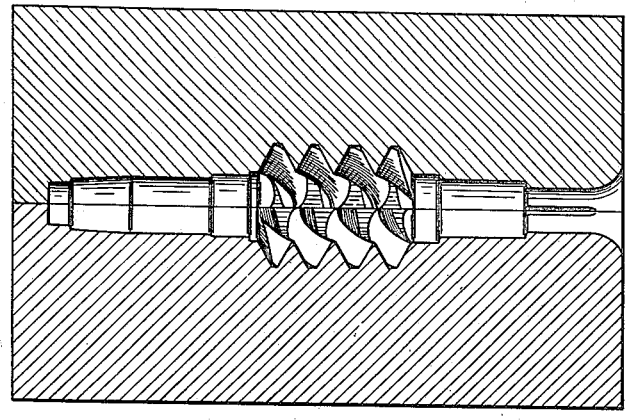

Figure 1 is a perspective view of a blank bar from which the worm may be formed;

Fig. 2, a plan view of the cylindric worm blank and indictators as formed by the preliminary forging operations;

Fig. 3, a side elevation of a casting formed as by pouring lead into the aperture formed by abutting and registering the thread impressions, to more clearly illustrate the conformation of the thread impressions;

Fig. 4, a plan view of the worm blank after being subject to the first blow of the thread impressions;

Fig. 4ª, a side view of the same showing the outwardly flared side portions of the worm threads, resulting from the peculiar conformation of the thread impressions;

Fig. 5, a side view, similar to Fig. 4ª, after the blank has been rotated a quarter turn, and been subject to the second blow of the thread impressions;

Fig. 6, a side elevation of the finished forged worm after it is completely formed with true threads;

Fig. 7, a plan view of a lower block containing the die impressions employed in the preliminary formation of the cylindric worm blank, and one of the thread impressions;

Fig. 8, and end projection of the same showing also the upper block;

Fig. 9, a section of the upper and lower blocks as on line 9—9, Figs. 6 and 7.

Similar numerals refer to similar parts throughout the drawing.

The worm is formed from a blank section of a bar 1, preferably a cylindric bar, as illustrated in Fig. 1, but which may be a round edge square billet, or any other desirable or convenient shape. The ends of the blank are preferably first drawn out and rounded between swedging impressions 2, which may be cut in the same blocks containing the forming impressions 3 and the thread impressions 4.

The stock is then shaped by dies 3 to provide a cylindric worm blank 6 having the outline forms 7 for the worm, 8 and 9 for the bearing ends, and 10 for the indicator guide shank, at the base of which indicator shank is formed the shoulder 11 which may constitute the end of the completed worm after the indicator shank is severed therefrom. The indicator shank may be preferably formed by the grooved ends 12 of the forming impressions 3.

The thread impressions 4 are provided with the peculiar conformations best illustrated in Figs. 7 and 9; and in Fig. 3, which is a side elevation of a casting formed as by pouring lead into the aperture formed by abutting and registering upper and lower thread impressions 4, it being understood however that in actually forging the threads of a gear worm, at no time does the cylindric worm blank assume the full conformation illustrated by Fig. 3, due to the fact that the first forging impressions are relatively shallow, and are successively increased in depth, and to the further fact that the cylindric worm blank is constantly rotated during the forging operations.

As may be seen from Figs. 7, 9 and 3, the thread impressions include ridges 13 which are cut in their middle portions to the proper conformation of corresponding upper and lower portions 14 of the desired worm threads, and are cut in their side portions to give the corresponding side portions of the worm threads an outwardly flaring conformation 15, in order to provide a proper amount of material for the side portions of the threads, as well as to provide the necessary clearance draft for the thread impressions, and by this conformation permitting the rearrangement of particles lying in cylindric elements of the cylindric worm blank, to lie in spiral or helical elements of the threads by the forging process.

Worm threads of proper conformation are then shaped around the cylindric worm blank 6 by means of successive blows or penetrations of the thread impressions 3; in which operations the middle portion of each die forms the thread more fully as to depth and width than the side portions thereof, because of the flare in the side portions of the ridges of the die, but nevertheless the median line of the partially formed thread is always in the true spiral or helical alinement intended for the finished thread.

Preferably between each blow or penetration, the worm blank is rotated preferably an equal amount as may be regulated by the preferably star shaped indicator guide shank 10 cooperating with suitably arranged slots 16 in the thread impression 4.

The particular gear worm 18 illustrated herein and shown in its final form in Fig. 6, is a four-thread worm of relatively long lead and having relatively great undercutting as may be clearly seen in Fig. 6. The indicator guide shank 10 for such a four-threaded worm may be preferably as illustrated, a four-pointed rectangular star section.

For a three-threaded worm, however, the indicator would be preferably a threepointed star, with similar variations for other multiple threaded worms.

The cylindric worm blank 6 after being subject in a stationary position to the first blow or blows of the thread impressions, assumes the conformation illustrated in Figs. 4 and 4ª.

The blank is then rotated a quarter turn from the stationary position in which the first blow or blows have been made, the quarter turn being regulated as aforesaid by the star indicator guide shank and the slot 16, and after the turn has been made, the blank remains stationary for the time being, and is subject to the second blow or blows of the thread impressions 4, and assumes the conformation illustrated in Fig. 5.

The blank is then subject to successive blows or penetrations of the thread impression, and successive quarter rotations, and the depth of successive penetrations of the thread impression into the worm blank are constantly increased, so that after a suitable number of blows or penetrations, which may be twelve for the worm illustrated, the completely formed threads 17 of the finished forged gear worm 18 are provided.

The aforementioned rotation of the worm blank between blows of the single pair or set of thread impressions has been found to spirally displace the particles in the worm blank as aforesaid from their original longitudinal location in the worm blank. The fact of this spiral or helical displacement of the particles may be observed by comparing the location of the particles outlining a longitudinal pipe in the cylindric blank with their location in the finished forged worm, in which they have been found to have taken a spiral location as aforesaid.

The entire improved process of forging from the blank bar to the completed worm can be and is carried out by a single heating of the stock, thereby avoiding the deteriorating action of a reheating of the same particularly upon the surface wearing portion of the worm thread.

The product which is described but not claimed herein, is made the subject matter of claims in applicant's copending application Serial No. 146,344, filed November 5, 1926.

I claim:

1. The method of forging gear worm threads on a cylindric blank which includes subjecting the blank to successive blows of identical thread impressions, and rotating the blank between blows.

2. The method of forging gear worm threads on a cylindric blank which includes subjecting the blank to successive blows of identical thread impressions, and rotating the blank between blows, the blows and rotation being continued until the threads are completely formed in the blank.

3. The method of making gear worm threads on a cylindric blank which includes rearranging longitudinally located particles in the blank to be spirally located thread particles by successive blows of identical thread impressions.

4. The method of making gear worm threads on a cylindric blank which includes rearranging longitudinally located particles in the blank to be helically located thread particles by successive blows of identical thread impressions.

5. The method of forging gear worm threads on a cylindric blank which includes subjecting the blank to successive penetrations of a single set of thread impressions, and rotating the blank between penetrations.

6. The method of forging gear worm threads on a cylindric blank which includes subjecting the blank to successive penetrations of identical thread impressions, and rotating the blank between penetrations, the penetrations and rotation being continued until the threads are completely formed in the blank.

7. The method of forging gear worm threads on a cylindric blank which includes subjecting the blank to successive blows of identical thread impressions, rotating the blank between blows, and regulating the force of successive blows.

8. The method of forging gear worm threads on a cylindric blank which includes subjecting the blank to successive blows of identical thread impressions, rotating the blank between blows, and regulating the force of successive blows, the blows and rotation being continued until the threads are completely formed in the blank.

9. The method of forging gear worm threads on a cylindric blank which includes subjecting the blank to successive penetrations of identical thread impressions, rotating the blank between penetrations, and varying the depth of the successive penetrations.

10. The method of forging gear worm threads on a cylindric blank which includes subjecting the blank to successive penetrations of identical thread impressions, rotating the blank between penetrations, and increasing the depth of the successive penetrations.

11. The method of forging gear worm threads on a cylindric blank which includes subjecting the blank to successive blows of identical thread impressions, rotating the blank between blows, and regulating the amount of rotation between blows by indicators.

12. The method of forging gear worm threads on a cylindric blank which includes subjecting the blank to successive blows of identical thread impressions, rotating the blank between blows, and regulating the amount of rotation between blows by indicators, the blows and rotation being continued until the threads are formed in the blank.

13. The method of forging gear worm threads on a cylindric blank which includes subjecting the blank to successive penetrations of identical thread impressions, rotating the blank between penetrations, and regulating the amount of rotation between blows by indicators.

14. The method of forging gear worm threads on a cylindric blank which includes subjecting the blank to successive penetrations of identical thread impressions, rotating the blank between penetrations, and regulating the amount of rotation by indicators, the penetrations and rotation being continued until the threads are completely formed in the blank.

15. The method of making gear worms which includes impressing an accurately aligned thread on a worm blank by successive blows of identical thread impressions more fully in the middle than at the sides, and rotating the blank between blows.

16. The method of making gear worms which includes impressing accurately aligned threads on a worm blank by successive blows of identical thread impressions more fully in the middle than at the sides, and rotating the blank between blows.

17. The method of making gear worms which includes impressing accurately aligned threads on a worm blank, said alignment being the same as that which constitutes the completed thread alignment, by successive blows of identical thread impressions more fully in the middle than at the sides, and rotating the blank between blows.

In testimony that I claim the above, I have hereunto subscribed my name.

ALBERT L. EICHER.